Jan. 6, 1953 M. D. SPARLIN 2,624,200
BRAKE FLUID INDICATOR
Filed Oct. 23, 1950

Marvin D. Sparlin
INVENTOR.

Patented Jan. 6, 1953

2,624,200

UNITED STATES PATENT OFFICE 2,624,200

BRAKE FLUID INDICATOR

Marvin D. Sparlin, Neosho, Mo.

Application October 23, 1950, Serial No. 191,526

1 Claim. (Cl. 73—323)

The present invention relates to new and useful improvements in indicators for the fluid in the master cylinder of a brake system and the invention has for its primary object to provide a visual indicator on the instrument panel of the vehicle and by means of which the level of the fluid in the brake system may be determined.

An important object of the invention is to provide a reservoir for the brake fluid positioned behind the instrument panel of a motor vehicle with a gage glass connected to the reservoir and visible through a window in the instrument panel to determine the level of fluid in the reservoir and also to provide a filler cap for the reservoir in the top of the instrument panel and by means of which the supply of fluid may be replenished in a convenient manner and without necessitating removal of the floor board of the vehicle, as is now customary.

A further object is to provide a device of this character of simple and practical construction, which may be easily and quickly mounted in position behind the instrument panel of a motor vehicle, and which at the same time is efficient and dependable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
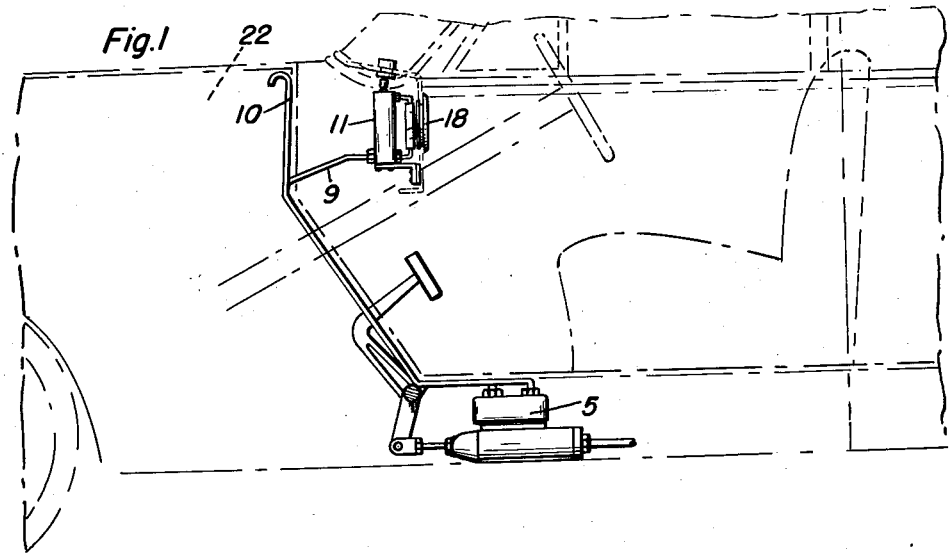
Figure 1 is a side elevational view.
Figure 2:
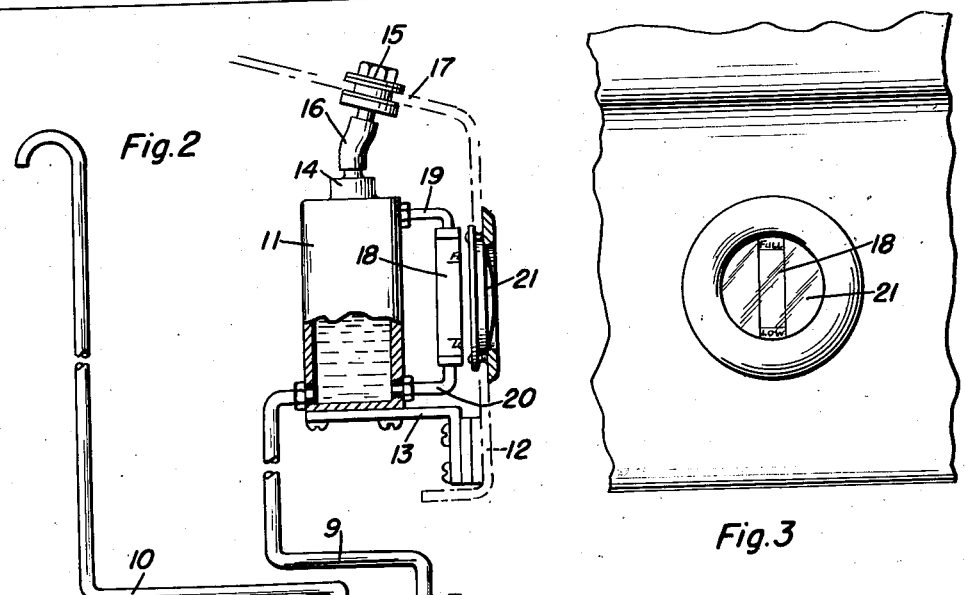
Figure 2 is an enlarged side elevational view with parts broken away and shown in section.
Figure 3:
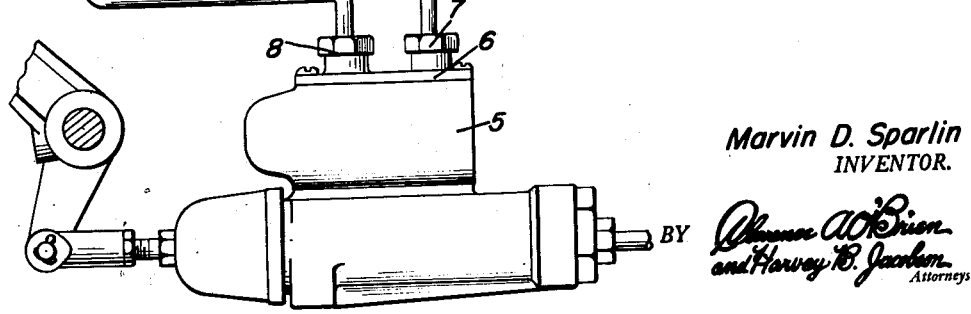
Figure 3 is a front elevational view of the window in the instrument panel for the gage glass.

Referring now to the drawing in detail wherein for the purpose of illustration I have disclosed a preferred embodiment of the invention, the numeral 5 designates the master cylinder of a conventional hydraulic brake system for a motor vehicle and provided with a cover plate 6 having fittings 7 and 8 by means of which tubes 9 and 10 may be connected to the top of the master cylinder.

Tube 9 extends upwardly to the lower portion of a tank or reservoir 11 which is supported behind the instrument panel 12 of the vehicle by a bracket 13.

The top of tank or reservoir 11 is provided with a nipple 14 to which a filler cap 15 is connected by means of a rubber hose 16, the filler cap 15 being mounted in the upper surface 17 of the instrument panel.

A gage glass 18 is connected at its upper and lower ends to the tank or reservoir 11 by tubes 19 and 20, the gage glass being positioned vertically behind a window 21 mounted in the instrument panel and whereby the level of the brake fluid contained in the tank or reservoir 11 may be observed by the driver of the vehicle.

Tube 10 constitutes a vent tube which extends upwardly under the hood 22 of the vehicle and is provided with a downwardly curved upper end or gooseneck 23 which is positioned above the horizontal plane of the top of tank or reservoir 11.

In the operation of the device the level of the brake fluid contained in the master cylinder 5 and tank or reservoir 11 may be observed in gage glass 18 through the window 21 of the instrument panel to thus warn the driver when it is necessary to replenish the fluid. This is accomplished through the filler cap 15 connected to the top of the tank or reservoir 11 and as the master cylinder 5 and tank or reservoir 11 are filled the air trapped in the master cylinder will be vented through the pipe 10.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A brake fluid level indicator for master brake cylinders comprising in combination, a tank, a bracket adapted for attaching to the rear of an instrument panel of a motor vehicle and supporting the tank behind an opening in the panel, a pipe connecting the bottom of the tank to the top of the cylinder for feeding fluid by gravity from the tank to the cylinder, a filler cap for the tank and mounted in the top of the instrument panel, a vent pipe rising from the cylinder to a point above the level of fluid in the tank, and a gage glass connected to a side of the tank in alignment with the opening in the instrument panel.

MARVIN D. SPARLIN.

REFERENCES CITED

The following references are of record in the file of this patent:

UNITED STATES PATENTS

| Number | Name | Date |
|---|---|---|
| 1,110,974 | Buskirk et al. | Sept. 15, 1914 |
| 1,564,701 | Mattingly | Dec. 8, 1925 |
| 2,085,173 | Stansbury | June 29, 1937 |
| 2,494,802 | Fox | July 17, 1950 |